United States Patent
Owens et al.

(10) Patent No.: US 7,589,719 B2
(45) Date of Patent: Sep. 15, 2009

(54) FAST MULTI-PASS PARTITIONING VIA PRIORITY BASED SCHEDULING

(75) Inventors: John Owens, Berkeley, CA (US); Andy Riffel, Davis, CA (US); Aaron Lefohn, Oakland, CA (US); Kiril Vidimce, San Francisco, CA (US); Mark Leone, Walnut Creek, CA (US)

(73) Assignees: The Regents of the University of California, Oakland, CA (US); Pixar, Emeryville, CA (US)

( * ) Notice: Subject to any disclaimer, the term of this patent is extended or adjusted under 35 U.S.C. 154(b) by 691 days.

(21) Appl. No.: 11/182,632

(22) Filed: Jul. 15, 2005

(65) Prior Publication Data

US 2006/0038811 A1 Feb. 23, 2006

Related U.S. Application Data

(60) Provisional application No. 60/588,538, filed on Jul. 15, 2004.

(51) Int. Cl.
*G06T 15/00* (2006.01)
*G06T 1/00* (2006.01)
*G06F 9/46* (2006.01)

(52) U.S. Cl. .................. 345/419; 345/522; 718/103; 718/104

(58) Field of Classification Search ................. 345/522; 718/102–108
See application file for complete search history.

(56) References Cited

U.S. PATENT DOCUMENTS

| | | | |
|---|---|---|---|
| 5,706,478 A * | 1/1998 | Dye | 345/503 |
| 5,790,862 A | 8/1998 | Tanaka et al. | |
| 5,838,988 A * | 11/1998 | Panwar et al. | 712/32 |
| 5,870,097 A * | 2/1999 | Snyder et al. | 345/426 |
| 6,085,212 A * | 7/2000 | Oberman | 708/505 |
| 6,411,302 B1 * | 6/2002 | Chiraz | 345/545 |
| 6,483,505 B1 * | 11/2002 | Morein et al. | 345/419 |
| 6,538,651 B1 * | 3/2003 | Hayman et al. | 345/419 |
| 6,578,197 B1 * | 6/2003 | Peercy et al. | 717/143 |
| 6,654,951 B1 | 11/2003 | Bacon et al. | |
| 6,825,843 B2 * | 11/2004 | Allen et al. | 345/522 |
| 6,980,216 B2 * | 12/2005 | Hancock et al. | 345/501 |
| 7,173,617 B2 * | 2/2007 | Driemeyer et al. | 345/426 |
| 2002/0026633 A1 | 2/2002 | Koizumi et al. | |

(Continued)

OTHER PUBLICATIONS

Aho, A.V. et al.; "Compilers: Principles, Techniques and Tools;" 1988; Addison-Wesley series in Computer Science; pp. 542, 557-567, and 660-667.*

(Continued)

*Primary Examiner*—Ulka Chauhan
*Assistant Examiner*—Crystal Murdoch
(74) *Attorney, Agent, or Firm*—Fenwick & West LLP (57) ABSTRACT

Computer operations are partitioned for execution by a processor. A plurality of operations to be partitioned is received. The respective priorities for each of the plurality of operations is determined. Ready operations are identified, where a ready operation is an operation that does not have any predecessor operations that have not yet been added to a partition. A determination is made whether adding the ready operations with the highest priorities to the current partition would violate a hardware resource constraint. Based on this determination, the ready operations are added to the partition. The operations added to the partition are provided to a processor for execution.

26 Claims, 10 Drawing Sheets

U.S. PATENT DOCUMENTS

| | | | |
|---|---|---|---|
| 2002/0072893 A1* | 6/2002 | Wilson | 703/26 |
| 2002/0149587 A1 | 10/2002 | Gorokhovik | |
| 2003/0076329 A1* | 4/2003 | Beda et al. | 345/557 |
| 2003/0132937 A1* | 7/2003 | Schneider et al. | 345/473 |
| 2003/0206165 A1 | 11/2003 | Hoppe et al. | |
| 2003/0218606 A1* | 11/2003 | Zhirkov et al. | 345/419 |
| 2005/0007372 A1* | 1/2005 | Ecob et al. | 345/473 |
| 2007/0022424 A1* | 1/2007 | Heirich | 718/102 |

OTHER PUBLICATIONS

Aho, A.V. et al., Compilers: Principles, Techniques and Tools, Section 9.10 ("Optical for Trees"), 1988, pp. 557-567.

Buck, I. et al., "Brook for GPUs: Stream Computing on Graphics Hardware," Proceedings of ACM SIGGRAPH, 2004, 10 pages.

Chaitin, G.J., et al., "Register Allocation Via Coloring," Computer Languages, 1981, pp. 47-57, vol. 6.

Chamberlain, B.L., "Graph Partitioning Algorithms for Distributing Workloads of Parallel Computations," Tech Rep. TR-98-10-03, 1998, pp. 1-32.

Chan, E. et al., "Efficient Partitioning of Fragment Shaders for Multipass Rendering on Programmable Graphics Hardware," Graphics Hardware, Sep. 2002, 11 pages.

Cook, R.L., "Shade Trees," Computer Graphics, Jul. 1984; pp. 223-231, vol. 18, No. 3.

Foley, T. et al., "Efficient Partitioning of Fragment Shaders for Multiple-Output Hardware," Graphics Hardware, Aug. 2004, 9 pages.

Fraser, C.W. et al., "A Retargetable C Compiler: Design and Implementation," 1995, pp. 373-406.

Hanrahan, P. et al., "A Language for Shanding and Lighting Calculations," Computer Graphics, Aug. 1990, pp. 289-298, vol. 24, No. 4.

Harris, M. J. et al., "Simulation of Cloud Dynamics on Graphics Hardware," Graphic Hardware, 2003, pp. 92-101.

Heirich, A., "Optimal Automatic Multi-Pass Shader Partitioning by Dynamic Programming," Graphics Hardware, 2005, 8 pages.

"High-Level Shader Language," Microsoft Corporation, 2006, [online] [Retrieved on May 8, 2006] Retrieved from the Internet<URL:http://msdn.microsoft.com/archive/en-us/directx9_c_summer_03/directx/graphics/reference/highlevel-langu...>.

Lindholm, E. et al., "A User-Programmable Vertex Engine," ACM SIGGRAPH 2001, 2001, pp. 149-158.

Mark, W.R. et al., "Cg: A System for Programming Graphics Hardware in a C-like Language," ACM Transactions on Graphics, Jul. 2003, pp. 896-907, vol. 22, No. 3.

Mark, W.R. et al., "The F-Buffer: A Rasterization-Order FIFO Buffer for Multi-Pass Rendering," SIGGRAPH/Eurographics Graphics Hardware Workshop 2001, ACM, 2001, pp. 57-63.

McCool, M.D. et al., "Shader Metaprogramming," Graphics Hardware, 2002, pp. 1-12.

"Microsoft DirectX: Home Page," Microsoft Corporation, 2006, [online] [Retrieved on May 8, 2006] Retrieved from the Internet<URL: http://www.microsoft.com/windows/directx/default.mspx>.

Olano, M. et al., "A Shading Language on Graphics Hardware: The PixelFlow Shading System," Proceedings of the ACM SIGGRAPH, 1998, pp. 159-168.

Peercy, M.S. et al., "Interactive Multi-Pass Programmable Shading," ACM SIGGRAPH 2000, pp. 425-432.

Perlin, K., "An Image Synthesizer," ACM SIGGRAPH '85, Jul. 22-26, 1985, pp. 287-296, vol. 19, No. 3.

Proudfoot, K. et al., "A Real-Time Procedural Shading System for Programmable Graphics Hardware," ACM Transactions on Graphics, Aug. 2001, 12 pages.

Purcell, T.J. et al., "Ray Tracing on Programmable Graphics Hardware," ACM Transactions on Graphics 21, Proceedings of the ACM SIGGRAPH 2002, Jul. 2002, pp. 703-712.

Sethi, R. et al., "The Generation of Optical Code for Arithmetic Expressions," Journal of the Association for Computing Machinery, Oct. 1970, pp. 715-728, vol. 17, No. 4.

"Sh: A High-Level Metaprogramming Language for Modern GPUs," [online] [Retrieved on May 8, 2006] Retrieved from the Internet<URL:http://libsh.org/>.

PCT International Search Report and Written Opinion, PCT/US05/25134, Mar. 12, 2007, 11 pages

* cited by examiner

Fig. 2

Fig. 3(a) Example of Priorities based on Sethi-Ullman Numbers

Fig. 3(c) Example of More Ready Successors (For Priority Scheme)

Fig. 3(b) Example of More Predecessors (For Priority Scheme)

Fig. 3(d)
Example of Critical Path (For Priority Scheme)

FIG. 4
PARTITIONING USING READY LIST SCHEDULING

Fig. 5

Fig. 6
Constraints for Particular Hardware

Fig. 7
Partitioning
Using
Depth First
Scheduling

US 7,589,719 B2

FAST MULTI-PASS PARTITIONING VIA PRIORITY BASED SCHEDULING

This application claims priority under 35 U.S.C. § 119(e) to U.S. Provisional Application No. 60/588,538 of Owens et al., filed Jul. 15, 2004, which is herein incorporated by reference.

BACKGROUND OF THE INVENTION

Recent advances in architecture and programming interfaces have added substantial programmability to graphics pipelined systems. These new features allow graphics programmers to write user-specified programs that run on each vertex and each fragment that passes through the graphics pipeline. Based on these vertex programs and fragment programs, people have developed shading languages that are used to create real-time programmable shading systems that run on modern graphics hardware.

The ideal interface for these shading languages is one that allows its users to write arbitrary programs for each vertex and each fragment. Unfortunately, the underlying graphics hardware has significant restrictions that make such a task difficult. For example, the fragment and vertex shaders in modern graphics processors have restrictions on the length of programs, on the number of resource constraints (i.e., temporary registers) that can be accessed in such programs, and on the control flow constructs that may be used.

Each new generation of graphics hardware has raised these limits. The rapid increase in possible program size, coupled with parallel advances in the capability and flexibility of vertex and fragment instruction sets, has led to corresponding advances in the complexity and quality of programmable shaders. For many users, the limits specified by the latest standards already exceed their needs. However, at least two major classes of users require substantially more resources for their application of interest.

The first class of users are those who require shaders with more complexity than the current hardware can support. Many shaders in use in the fields of photorealistic rendering or film production, for instance, exceed the capabilities of current graphics hardware by at least an order of magnitude. The popular RenderMan shading language, for example, is often used to specify these shaders, and RenderMan shaders of tens or even hundreds of thousands of instructions are not uncommon. Implementing these complex RenderMan shaders is not possible in a single vertex or fragment program.

The second class of users use graphics hardware to implement general-purpose (often scientific) programs. This "GPGPU" (general-purpose on graphics processing units) community targets the programmable features of the graphics hardware in their applications, using the inherent parallelism of the graphics processor to achieve superior performance in microprocessor-based solutions. Like complex RenderMan shaders, GPGPU programs often have substantially larger programs that can be implemented in a single vertex or fragment program. They may also have more complex outputs. For example, instead of a single color, they may need to output a compound data type.

To implement larger shaders than the hardware allows, programmers have turned to multipass methods in which the shader is divided into multiple smaller shaders, each of which respects the hardware's resource constraints. These smaller shaders are then mapped to multiple passes through the graphics pipeline. Each pass outputs results that are saved for use in future passes.

A key step in this process is the efficient partitioning of the program into several smaller programs. For example, a shader program may be partitioned into several smaller shader programs. Conventional programs often use the RDS (Recursive Dominator Split) method. This method has two major deficiencies. First, shader compilation in modern systems is performed dynamically at the time the shader is run. Consequently, graphics vendors require algorithms that run as quickly as possible. Given n instructions, the runtime of RDS scales as $O(N^3)$. (Even a specialized, heuristic version of RDS, $RDS_h$ scales as $O(N^2)$.) This high runtime cost makes conventional methods such as RDS undesirable for implementation in run-time compilers. Second, many conventional partitioning systems assume a hardware target that can output at most one value per shader per pass. Modern graphics hardware generally allows multiple outputs per pass.

There is a need for a partitioning method and system that operates as quickly as possible. There is also a need for a partitioning method and system that allows the output of more than one value from the resulting partitions.

SUMMARY OF THE INVENTION

The described embodiments of the present invention include a method and system for partitioning operations. In a preferred embodiment of the present invention, the operations are first prioritized, then placed into one or more partitions. Each of the partitions can then be executed during a plurality of passes.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIG. 3(*a*) is a directed acyclic graph in which the nodes are assigned priorities in accordance with a first priority scheme.

FIGS. 3(*b*)-3(*d*) show details of additional priority schemes.

FIGS. 3(*e*) and 3(*f*) show example of different partitions of the same graph.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
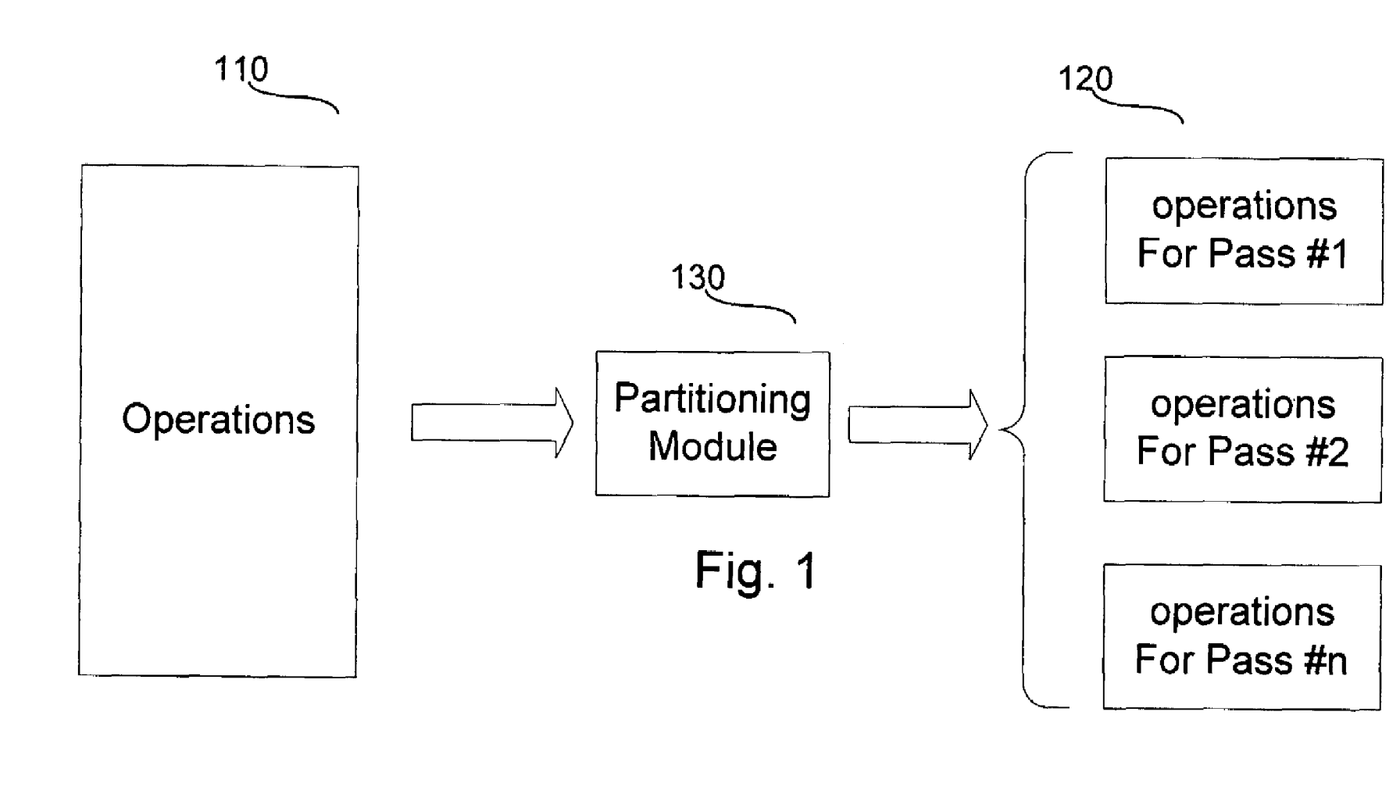
FIG. 1 is a block diagram showing operations to be partitioned.

FIG. 1 is a block diagram showing operations 110 to be partitioned. In a described embodiment of the present invention a partitioning module 130 partitions a plurality of operations 110 into a plurality of smaller programs 120 for execution by a processor (or by a plurality of processors (not shown)). Partitioning module 130 preferably contains instructions that can be executed in a data processing system to perform the partitioning operations of the described embodiments of the present invention. The instructions of module 130 are stored, for example, in a memory or appropriate storage media, as are the operations 110 to be partitioned. Partitioning module 130 can be embodied in hardware, software, or firmware. The processor(s) (not shown) can be embodied in, for example, a single data processing system, a general purpose data processing chip, a graphics processing unit, a distributed data processing system, or a networked data processing system. For example, partitioning module 130 may partition a software shader program into smaller programs that are executed by multiple passes through a graphics pipeline.

Figure 2:
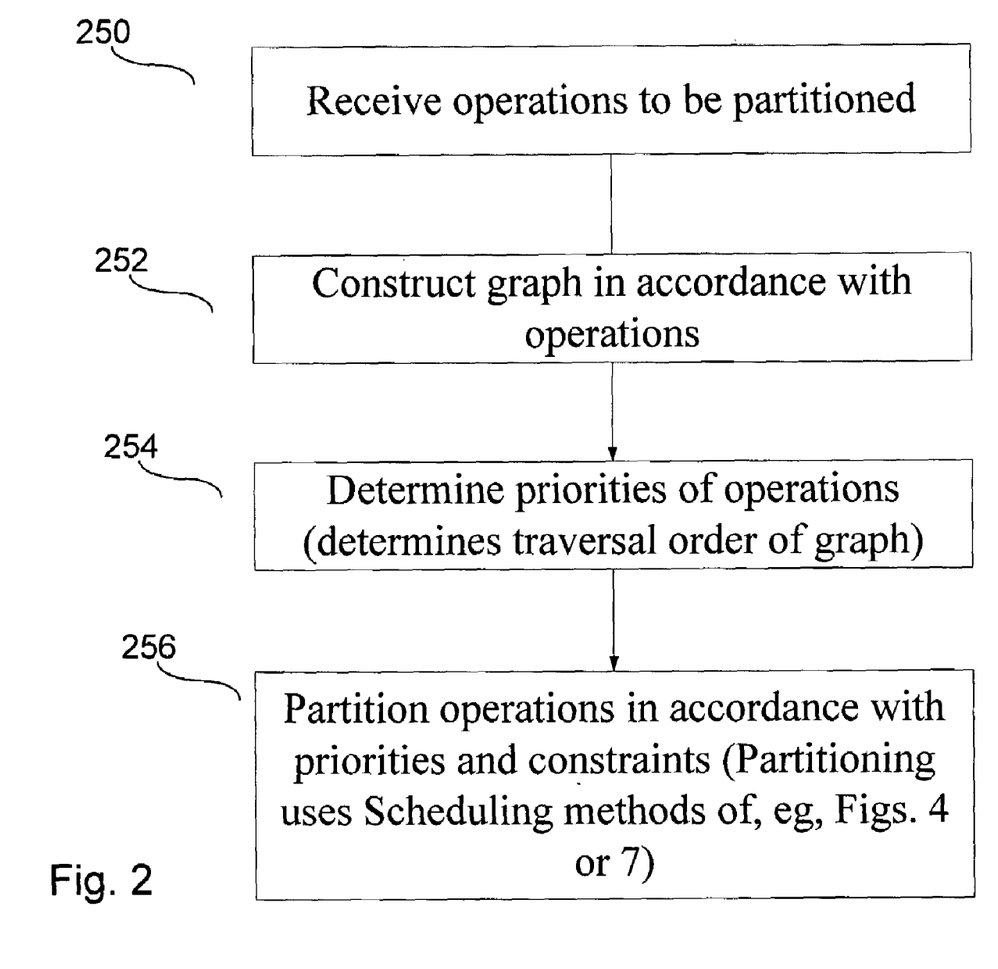
FIG. 2 is a flow chart showing a method for partitioning operations.

FIG. 2 is a flow chart showing a method for partitioning operations. The method is performed, for example, by partitioning module 130 of FIG. 1. As will be understood by persons of ordinary skill in the art, the method can be embodied in instructions stored on a computer readable medium such as a memory, disk, hard drive, CDROM, or a transmission media such as signals on a network connection or signals on a wireless network connection. Element 250 receives operations to be partitioned such as operations 110 of FIG. 1. Element 252 constructs a graph, such as a DAG (Directed Acyclic Graph) based on the operations using a method known to persons of ordinary skill in the art. The DAG reflects a relationship and dependency between the operations.

Element 254 determines a priority of the operations of the graph. The determined priority is used to decide an order of traversal of the graph during the partitioning process. The present invention may be used with several priority methods, some of which are described below in connection with FIGS. 3(*a*)-3(*d*). These priority methods are sometimes called "scheduling methods" herein although they do not actually schedule the operations. Instead, they determine an order in which the nodes of the graph are visited during the partitioning process. Element 256 places the operations into one or more partitions. Each of these partitions may be thought of as one of the smaller programs 120 of FIG. 1. As is described below in more detail, operations are partitioned in accordance with their resource usage and with hard and soft resource constraints of the hardware upon which they will later be executed.

FIG. 3(*a*) is a directed acyclic graph (DAG) in which each node corresponds to an operation. This graph represents a data structure or similar construct in memory created by partitioning module 130. In FIG. 3(*a*), the nodes are assigned priorities in accordance with a first priority scheme that employs Sethi-Ullman numbering. Sethi-Ullman numbering is described in, for example, "R. Sethi and J. D. Ullman, "The Generation of Optimal Code for Arithmetic Expressions," J. Assoc. Computing Machinery, pp. 715-728, ACM, 1970," which is incorporated by reference herein. Sethi-Ullman numbers are further described in Section 9.10 ("Optimal Ordering for Trees") of "Compilers: Principles, Techniques, and Tools", Alfred V. Aho, Ravi Sethi, and Jeffrey D. Ullman (Addison-Wesley, 1988), which is incorporated by reference herein.

Figure 3A:
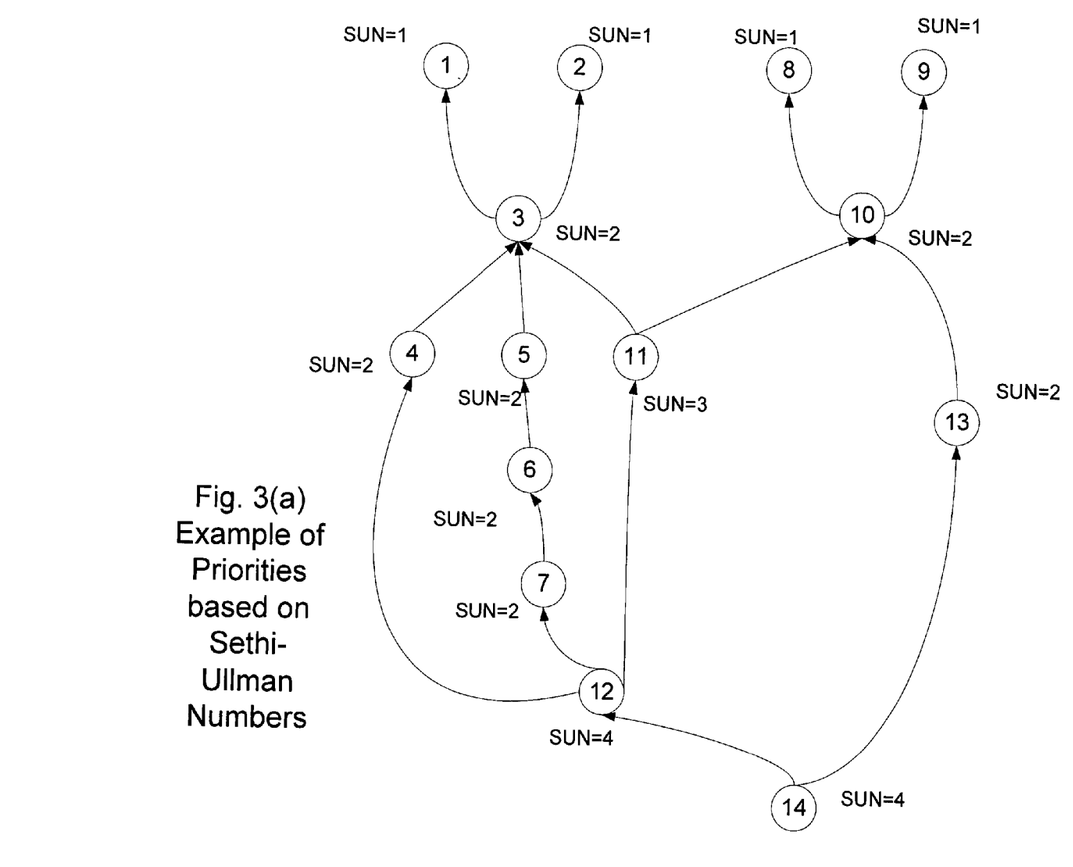

In general, this priority scheme orders a graph or tree of operations based on resource usage. A register is an example of a resource and Sethi-Ullman numbers are just one example of a resource estimate. The crux of a priority scheme based on Sethi-Ullman numbers is that performing resource-intensive calculations first frees up resources for later calculations.

Here, the resource usage of an operation and its children is used to calculate a Sethi-Ullman number for its node. The method labels each node in the graph with a Sethi-Ullman Number (SUN) that indicates a number of registers required to execute the operations in the subtree rooted at that node. In general, for tree-structured inputs, partitioning higher-numbered nodes first minimizes overall register usage. In the example, a node above another node is considered to be a child of that node. Thus, for example, in FIG. 3(*a*), node #1 is a child of node #3. In the figure, a node above another node is considered to be a predecessor of that node. Thus, for example, in FIG. 3(*a*), node #1 is a predecessor of node #3. Similarly. Node #3 is a successor of node #1.

The simple case of Sethi-Ullman numbering involves a node "N" whose children are labeled L1 and L2. Node N represents an operation that requires one register to hold its result. The label of N is determined by:

if (L1=L2)
then label(N)=L1+1
else label(N)=max(L1, L2)

This method assumes that each operation stores a result in a register. When both children require M registers, we need a register to hold the result of one child while M registers also are used for the other child, so the total required is M+1. That extra register is not needed if the children have different register requirements, as long as the child with the bigger resource requirement is run first.

In the more general case where there are K children:
let N1, N2, . . . Nk be the children of N ordered by their labels, so that label(N1)>=label(N2)>= . . . >=label(Nk);
label(N)=max(from i=1 through K) of label(Ni)+i−1;

In the example of FIG. 3(*a*), the nodes are all assumed to require one output register. Thus, node #3 (as labeled inside the node) has a Sethi-Ullman Number (SUN) of 2 because both of its children have SUNs of 1 (1+1=2). Similarly, nodes #4 and #5 have SUNs of 2 since their child (node #3) has a SUN of 2. Similarly, node #11 has a SUN of 3 since its children (nodes #3 and #10) have a SUN of 2 (2+1=3).

As shown in FIG. 3(*a*), the SUN values assigned to the nodes result in the following in-order traversal of nodes: 1, 2, 3, 8, 9, 10, 11, 4, 5, 6, 7, 12, 13, 14. The "pre-order traversal" is as follows: 14, 12, 11, 3, 1, 2, 10, 8, 9, 4, 7, 6, 5, 13. The two traversal orders are equivalent traversals: the in-order traversal specifies which operations are scheduled first, whereas the pre-order traversal specifies the order in which the nodes are visited by the scheduling algorithm (i.e. the operations are not scheduled on the way towards the leaves, they are scheduled on the way back to the root).

In a preferred embodiment, SUNs are assigned to the graph in a first stage and a traversal order is determined during a second stage. The first stage is order O(n) with the number of input nodes. In the second stage to determine traversal order the method preferably uses a depth-first traversal through the graph, preferably choosing the node with a higher Sethi-Ullman number. Ties are broken in a deterministic and consistent manner. (For example, ties can be broken user a comparison of pointers in the node) This stage is also order O(n) with the number of input nodes.

FIGS. 3(*b*)-3(*d*) show details of additional priority schemes. In general, the priority schemes described in this document prefer depth first traversal (i.e., depth first traversal and the ready list method described herein) over breadth first traversal. This preference tends to minimize register usage. FIGS. 3(*e*) and 3(*f*) shows an example of two possible ways to partition example graphs. A first graph of FIG. 3(*e*) tries to maximize parallelism in the operations by placing nodes #1, #2, #3, and #4 in the same partition. This approach is often used in conventional methods and results in four pieces of information (from nodes #1, #2, #3 and #4) that need to be passed to a second partition having nodes #5, #6, and #7 therein.

In contrast, the described embodiments of the present invention tend to minimize register usage. Thus, the graph in FIG. 3(f) partitions nodes #1, #2, and #5 together and partitions nodes #3, #4, #6, and #7 together. This results in only one piece of information that needs to be passed between the two partitions.

Figure 3B:
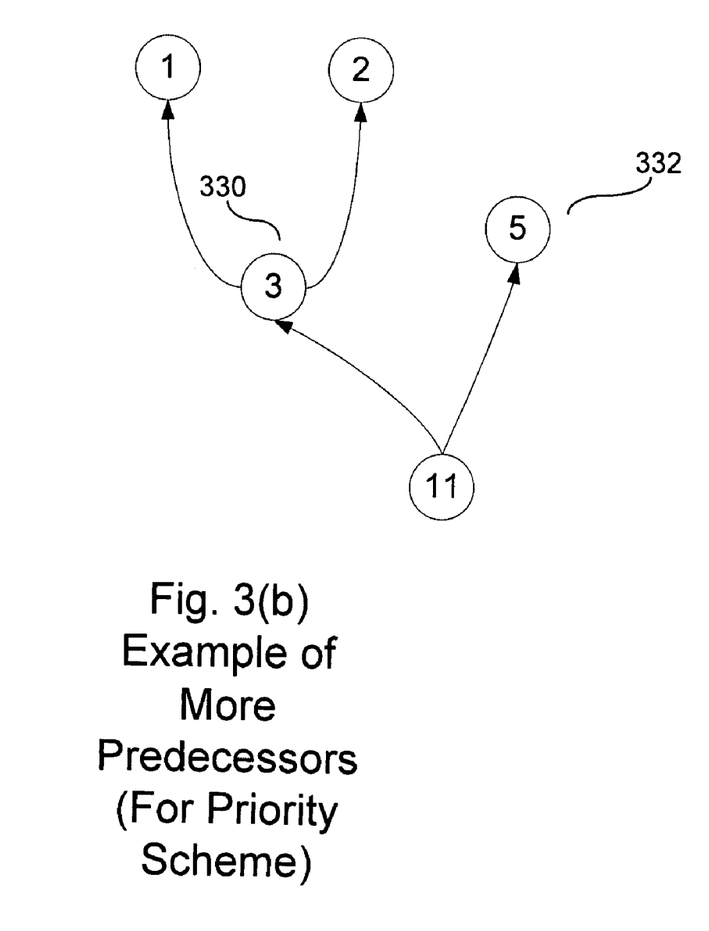

FIG. 3(b) shows an example of a More Predecessors method. In this method, node #3 330 would be given a higher priority than node #5 332 because node #3 has more predecessors (nodes #1 and #2 vs. none).

Figure 3C:
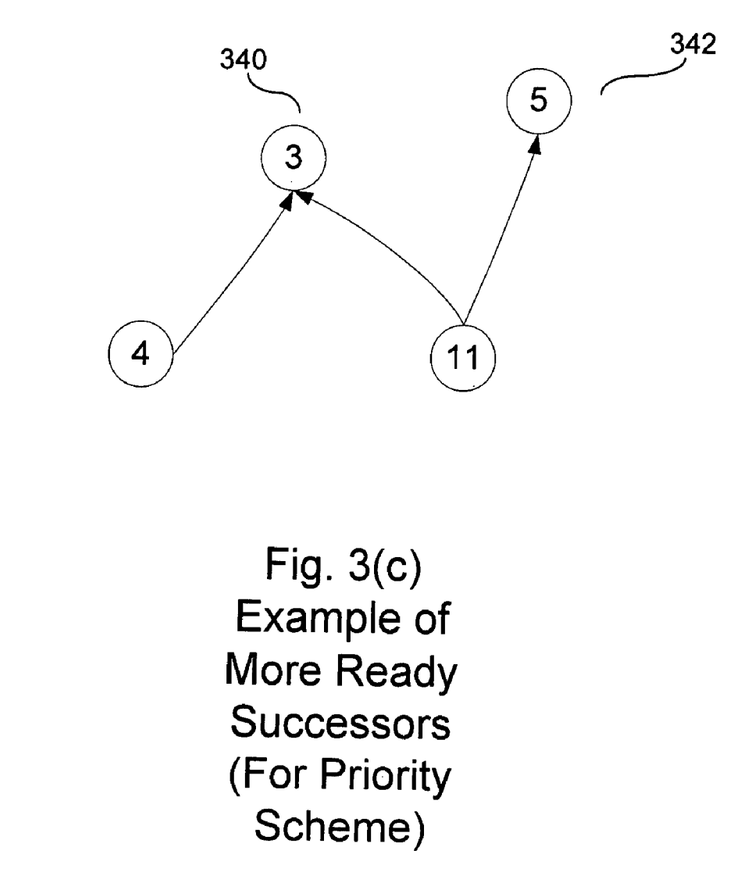

FIG. 3(c) shows an example of a More Ready Successors method. In this method, node #3 340 would be given a higher priority than node #5 342 because node #3 has more ready successors (nodes #4 and #11 vs. just node #11).

Figure 3D:
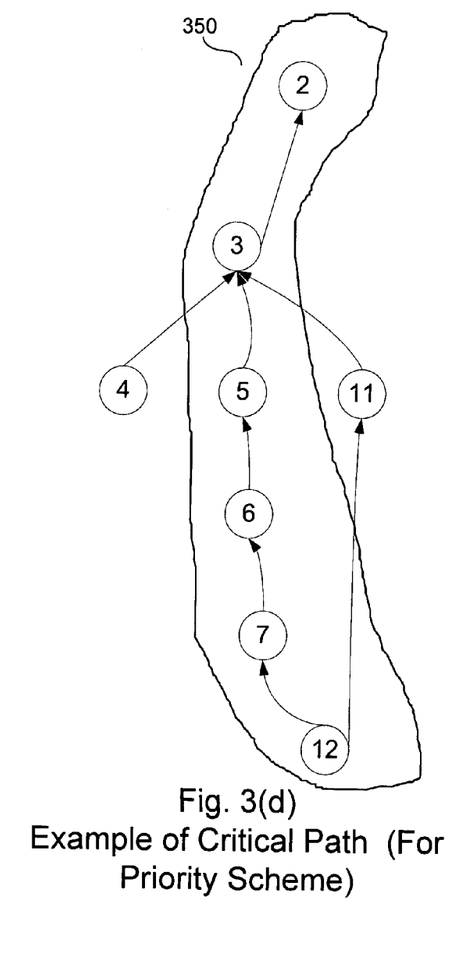
Figure 3E:
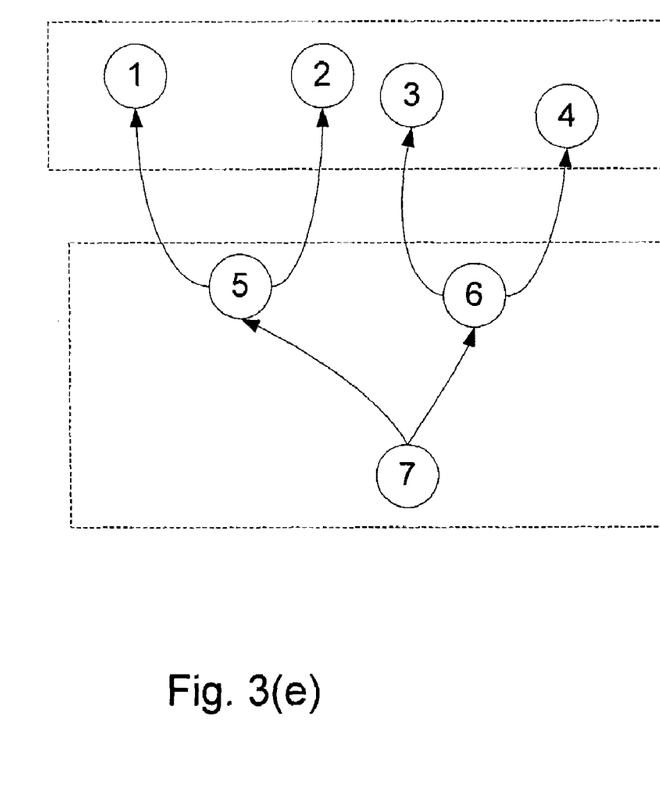
Figure 3F:
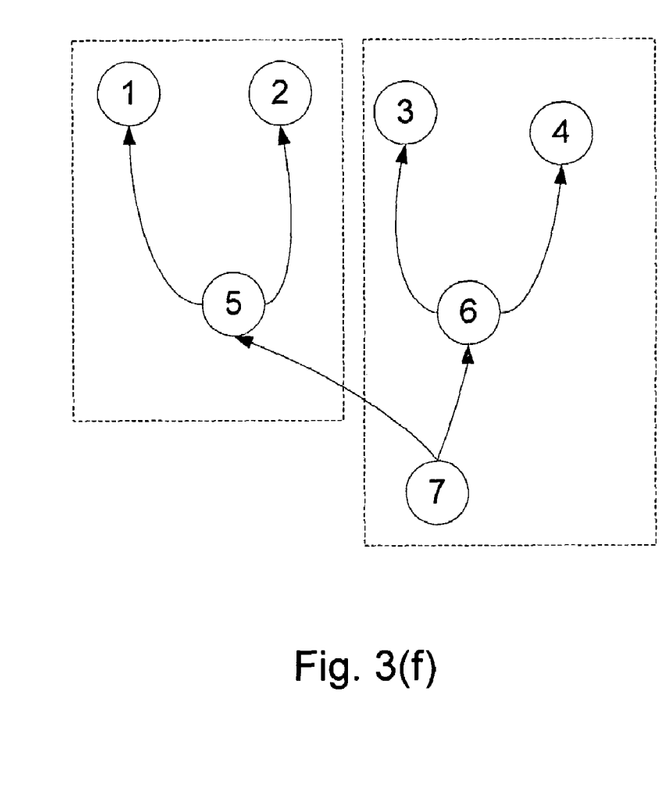

FIG. 3(d) shows an example of a Critical Path priority scheme. Here, all nodes on path 350 have a high priority since path 350 is a longest path and should be prioritized first. Edge weights, representing latencies between operations, can be assigned to each edge, and then used to determine the path length between input and output nodes. Therefore the longest path is not necessarily the path with the most operations.

Another alternate priority method keeps track of register usage. Specifically, the method keeps track of which operations incur additional register usage (generate) and which operations reduce register usage (kill). Given a choice, operations that kill registers are preferred over registers that generate registers. Note that since Sethi-Ullman numbering accounts for register usage, this priority method is redundant when using SUN.

Various embodiments of the present invention, uses one or more of the above described priority determining methods. As an example, a preferred embodiment uses a combination as follows: The highest priority nodes are those that reduce register usage, followed by those that leave register usage constant, and finally those that increase register usage. This is the highest priority metric because it most directly affects a number of live registers. The second highest priority metric is to partition operations that will create more ready successors rather than fewer ready successors. The third priority metric is to partition nodes with more predecessors over fewer predecessors and the final priority metric is to partition nodes closest to the critical path.

Figure 4:
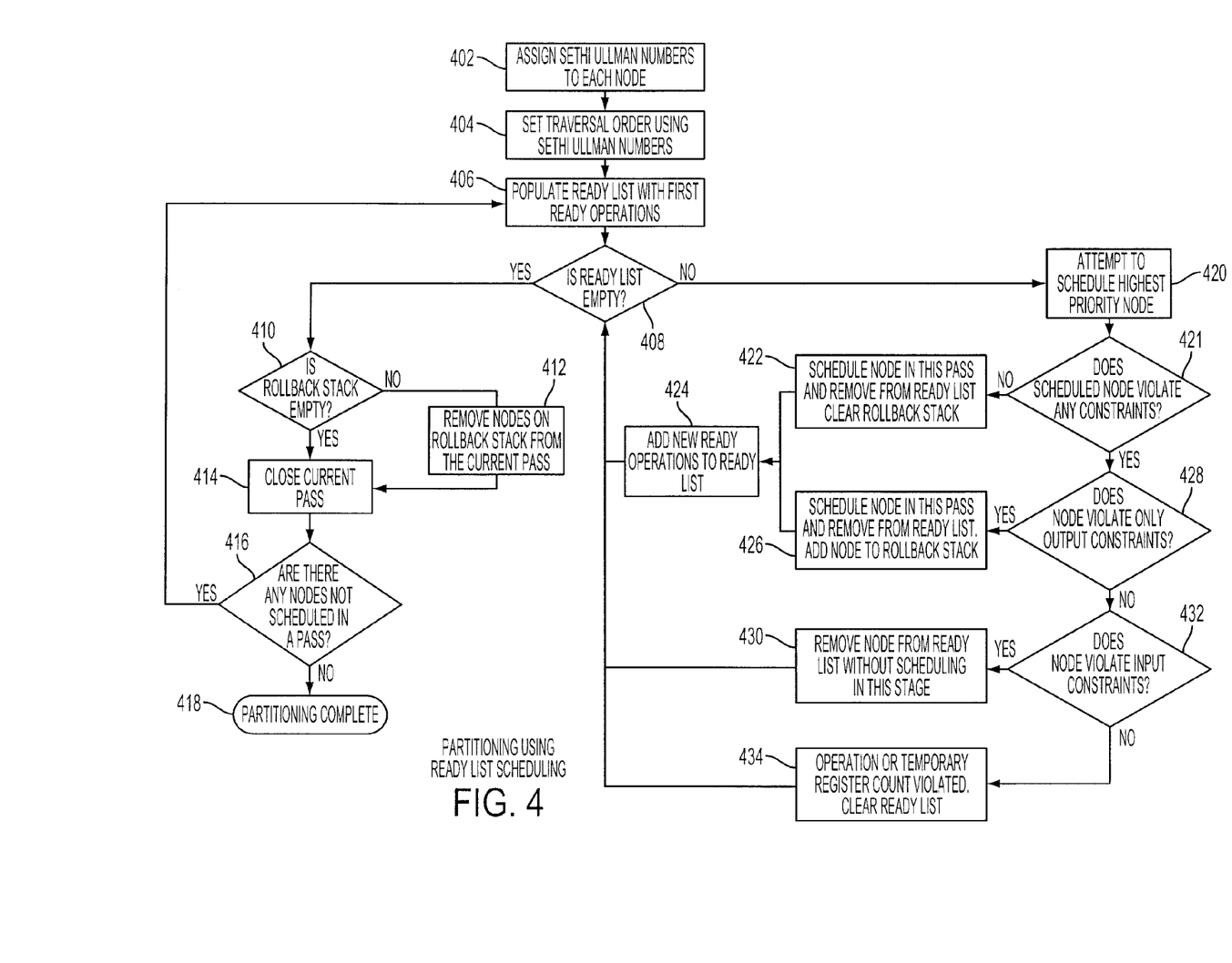
FIG. 4 is a flow chart showing details of a scheduling method that can be used to partition in the method of FIG. 1 in accordance with an embodiment of the present invention.
Figure 5:
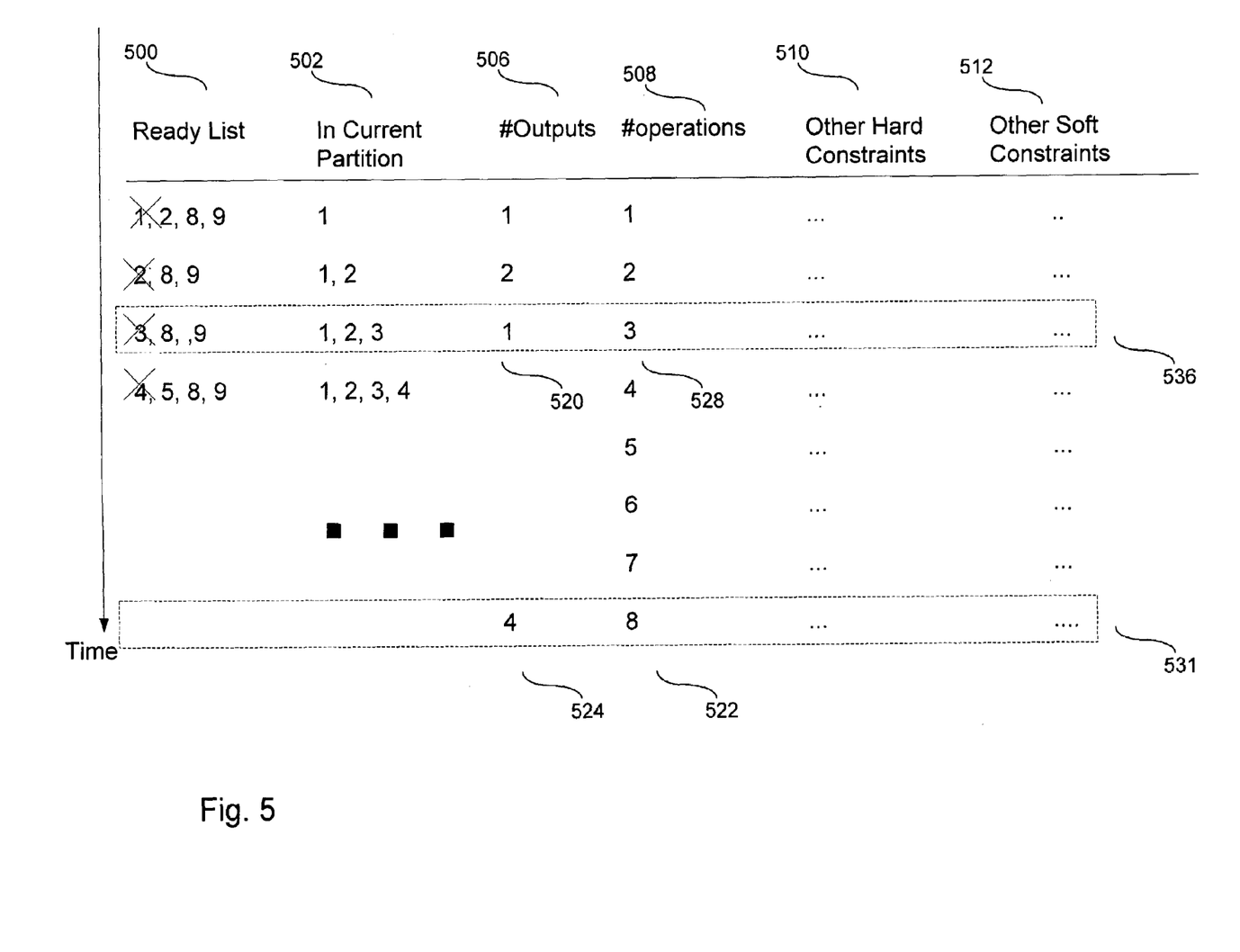
FIG. 5 is an example of a ready list using the priority scheme of FIG. 3.

FIG. 4 is a flow chart showing details of the method of FIG. 1 in accordance with an embodiment of the present invention. Specifically, FIG. 4 shows a method of partitioning nodes in partitioning module of FIG. 1 using a scheduling algorithm. The method can be used to partition any list of operations that must be partitioned because of resource constraints. FIG. 5 is an example of a ready list data structure 500 stored in an appropriate memory and using the priority scheme of FIG. 3. The following discussion provides an example of partitioning the nodes of the graph of FIG. 3(a) using a ready list scheduling algorithm to determine tree traversal order.

Elements 402 and 404 correspond to element 254 of FIG. 2, which determines a traversal order. Element 406 adds child nodes to a "ready list" 500. In this example, initially child nodes #1, #2, #8, and #9 are added to the ready list. The remainder of elements form a loop that is executed until all nodes are scheduled into a partition.

Element 420 chooses a node having a highest priority from the ready list. If the node does not violate any constraints (element 421) the node is added to the current partition 502 and removed from the ready list 500 (element 422). In the example, node #1 is removed from the ready list and-placed in the partition 502. (Removal from the ready list is indicated by placing an "x" through the node number in the Figure). A rollback stack in memory is also cleared at this time. If the node violates only soft constraints (such as output constraints) (element 428), the node is scheduled in the current partition anyway and removed from the ready list (element 426). The node is added to the rollback stack. If the node violates an input constraint (element 432) the node is removed from the ready list without scheduling it in this stage (element 430). If the node violates neither input nor output constraints (element 432) then an operation count constraint or a temporary register count constraint (i.e., a hard constraint) has been violated and the ready list is cleared (element 434). This causes a rollback in element 408.

In the example, a hard constraint is violated when the number of operations exceeds 8 at time 531. At this time, the partition is rolled back (elements 410, 412, 414) to a time 536, which, in the example, was the most recent time that all hard and soft constraints were met. In the example, at this time, only nodes #1, #2, and #3 are in the partition 502.

Element 424 is executed after a node is schedule in either element 422 or 426. Element 424 adds new ready operations to the ready list and execution continues with element 408. In the example, when node #1 is removed from the ready list and added to the partition, its parent nodes #3 is not added to the list. Node #3 becomes ready and is added when its other child node #2 is added to the partition. In other words, a node preferably is added to the ready list when all of its children have been added to the partition In the example, the number of outputs 506 is a soft constraint and the number of operations in the partition is a hard constraint. These are used for the purpose of example only. In general, soft constraints are metrics that can potentially rise or fall with the addition of more operations to the partition. In contrast, hard constraints can only rise with more operations. A critical resource is a resource that has reached its constraint in the current partition. When a soft constraint is violated, there is a possibility that it will not remain in a state of violation in the future, while a hard constraint will continue to be violated. Both constraints must be met at the close of a partition. Other embodiments can use additional or other hard and soft constraints 510 and 512. Examples of hard constraints include, but are not limited to, a number of operations currently in a partition (as in the example) and a number of temporary registers used. Examples of soft constraints include, but are not limited to, a number of textures (stored in global memory), whether a varying input is used, uniforms, a number of constants, and a number of outputs (as in the example). The method allows the usage of operations that temporarily overuse constraints such as the number of outputs with the hope that future operations will return the schedule to compliance.

In one embodiment, nodes that do not use a critical resource are assigned a higher priority "on the fly."

Figure 6:
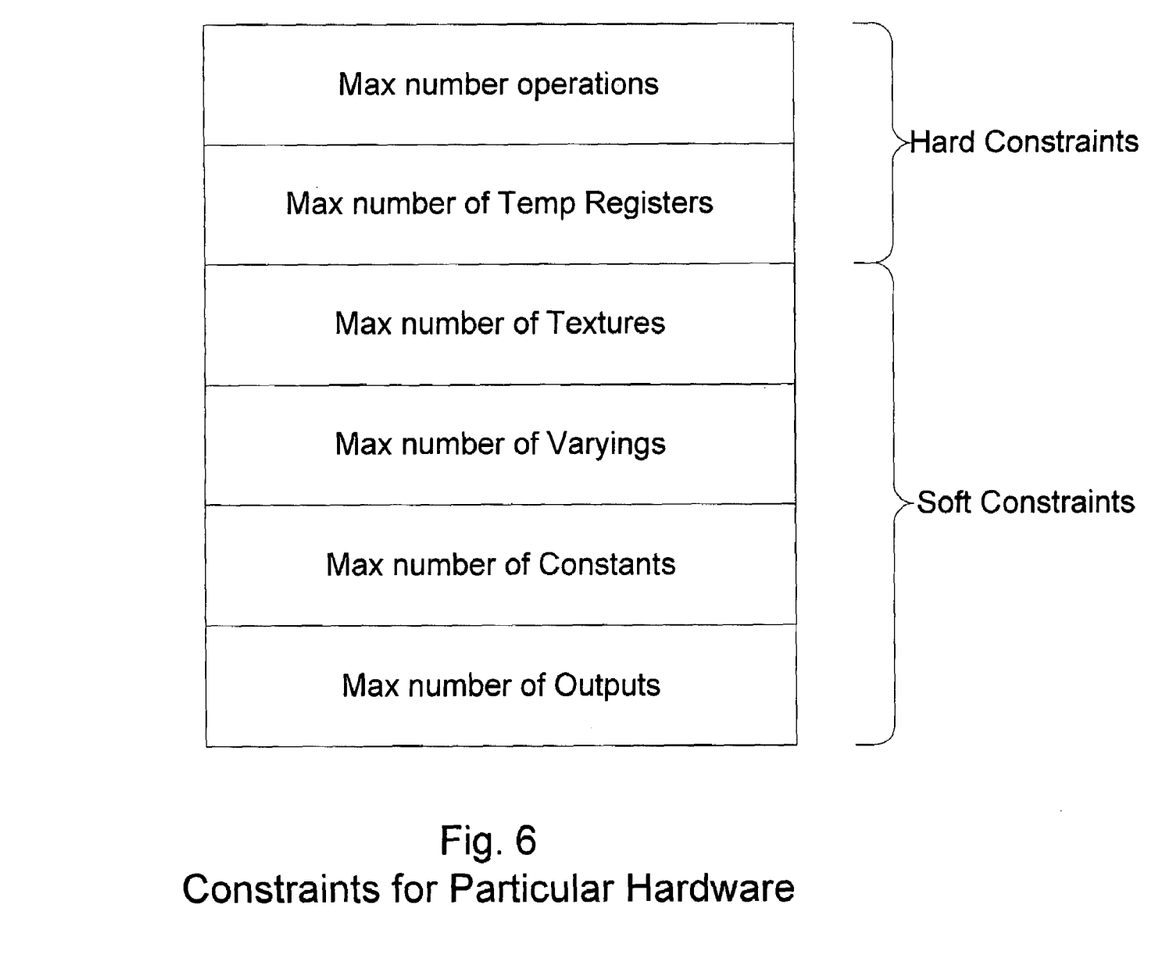
FIG. 6 is an example of constraints stored in a memory that are specific to particular hardware.

FIG. 6 is an example of constraints stored in a memory that are specific to particular hardware. These values are evaluated each time a node is added to the partition. Exactly which types of values are hard constraints and which are soft constraints will vary with the type of hardware on which the partitioned operations will be executed. Thus, the constraints used and their designation as hard or soft will vary depending at least on the target hardware.

Sethi-Ullman numbers are just one example of a resource estimate that can be used as part of a priority scheme. Multipass partitioning can use other types of priority schemes. For example, the number of texture units can be used as a criteria instead of a number of output registers. In general, these resource estimates can be combined (for example, using a weighted sum) to direct the depth-first partitioner toward the most resource-intensive operations.

Figure 7:
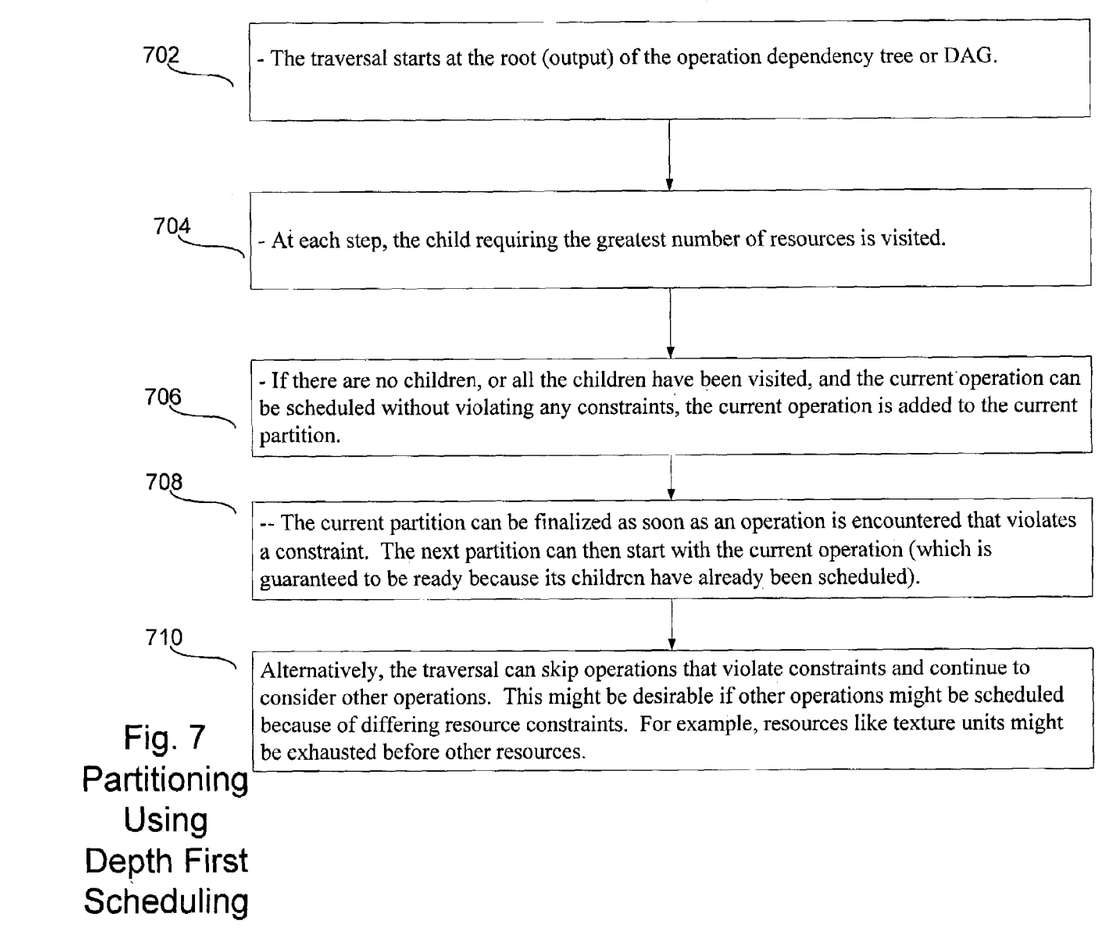
FIG. 7 is a flow chart showing details of a scheduling method that can be used to partition in the method of FIG. 1 in accordance with an embodiment of the present invention.

Partitioning also can be performed with a depth-first traversal of the DAG. Directed depth-first scheduling is a solution to the multi-pass partitioning problem (MPP) that relies on a pre-pass to compute resource usage information followed by a depth-first traversal that is guided by those resource estimates. A method using directed depth-first scheduling is described below and shown in 7.

The depth-first traversal is performed as follows

The traversal starts at the root (output) of the operation dependency tree or DAG (element 702). In FIG. 3(*a*), the root node is node #14.

At each step, the child requiring the greatest number of resources is visited (element 704).

If there are no children, or all the children have been visited, and the current operation can be scheduled without violating any constraints, the current operation is added to the current partition (element 706). The operations are then partitioned traversing the DAG in in-order traversal, using the pre-order traversal determined by the depth first method. One implementation uses a recursive algorithm to implement this method.

The current partition can be finalized as soon as an operation is encountered that violates a constraint. The next partition can then start with the current operation (which is guaranteed to be ready because its children have already been scheduled) (element 708).

Alternatively, the traversal can skip operations that violate constraints and continue to consider other operations (element 710). This might be desirable if other operations might be scheduled because of differing resource constraints. For example, resources like texture units might be exhausted before other resources.

Multipass partitioning also can use other kinds of resource estimates instead of register usage. For example, the number of texture units required to execute a partition could be used. In general, these resource estimates can be combined (for example, using a weighted sum) to direct the depth-first scheduler toward the most resource-intensive calculations.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of partitioning operations, the method implemented on a data processing system, comprising:
   receiving a plurality of operations to be partitioned;
   determining respective priorities for each of the plurality of operations;
   partitioning the plurality of operations for execution, the partitioning comprising:
      identifying ready operations from the plurality of operations, a ready operation comprising an operation that does not have any predecessor operations that have not yet been added to a partition;
      determining whether adding a ready operation with a highest priority to the partition violates a hardware resource constraint, the determining performed by the data processing system; and
      responsive to the ready operation with the highest priority not violating a hardware resource constraint, adding the ready operation to a current partition.

2. The method of claim 1, wherein the priority for an operation is determined by assigning a priority based on a number of registers required to execute a subtree of the operation.

3. The method of claim 1, wherein the priority for an operation is determined by assigning a priority based on a Sethi-Ullman number of the operation.

4. The method of claim 1, where the method is performed for graphics operations usable in a graphics processing unit (GPU).

5. The method of claim 1, further including:
   responsive to the ready operation with the highest priority violating a hardware constraint by overusing a number of outputs per partition, temporarily adding the ready operation to the current partition.

6. The method of claim 1, further including:
   if a hard hardware resource constraint is violated, performing a rollback to a point where all hard constraints are met; and
   adding at least one of the rolled back operations to a new ready list.

7. the method of claim 1, further including keeping track of hardware resources and registers used by each operation.

8. The method of claim 7, wherein hardware resources include at least one of the following: slots in a graphics shader operation memory used by each operation, a number of constant and varying inputs, number of textures accessed, number of internal registers used, and number of allowed outputs per pass.

9. The method of claim 1, where determining respective priorities is based at least in part on minimizing a number of passes in the partitioned operations.

10. The method of claim 1, further comprising:
    determining that a partition has been completed when hard hardware resource constraints are violated.

11. The method of claim 1, wherein partitioning further comprises:
    differentiating between hard and soft hardware resource constraints, hard hardware resource constraints being constraints that, once violated, make it impossible to partition more operations; and soft hardware resource constraints being constraints that, once violated, allow more operations to be partitioned.

12. The method of claim 1, wherein the respective priorities for each of the plurality of operations are stored
    in a data structure in memory that represents dependencies between the operations, the priorities assigned in accordance with the operation's register usage, whether the operation creates more ready successors, and a number of predecessors to the operation.

13. The method of claim 12, wherein the priority for a operation is determined by assigning a highest priority to operations that reduce register usage, assigning a next highest priority to operations that create more ready successors than fewer ready successors, assigning a next highest priority to operations with more predecessors than fewer predecessors and assigning a next highest priority to operations closest to a critical path.

14. The method of claim 12, further including:
    responsive to the ready operation with the highest priority violating a hardware constraint by overusing a number of outputs per partition, temporarily adding the ready operation to the current partition.

15. The method of claim 12, further including:
performing a rollback to a point where all hard hardware resource constraints are met; and
scheduling at least one of the rolled back operations in a next stage.

16. The method of claim 12, where the method is performed for graphics operations usable in a graphics processing unit (GPU).

17. The method of claim 12, further including keeping track of hardware resources and registers used by each partitioned operation.

18. The method of claim 17, wherein hardware resources include at least one of the following: slots in graphic shader operation memory used by each partitioned operation, a number of constant and varying inputs, number of textures accessed, number of internal registers used, and number of outputs.

19. The method of claim 12, where determining respective priorities is based at least in part on minimizing a number of operations per pass.

20. The method of claim 12, further comprising:
determining that a partition has been completed when hard hardware resource constraints are violated.

21. The method of claim 12, further including use of a depth-first method of traversing the operations.

22. The method of claim 12, further including use of a Sethi-Ullman based method of traversing the operations.

23. A method, performed by a data processing system, of partitioning a plurality of operations for execution, represented by an operation dependency graph in a memory, comprising:
performing, using a data processing system, a depth-first traversal of the operation dependency graph starting at a root of the graph, comprising:
at each step of the traversal, visiting a child operation that requires a greatest number of hardware resources;
if a currently visited operation has no children, or all the children have been visited, and the currently visited operation can be scheduled without violating any hardware resource constraints, adding the currently visited operation to a current partition;
finalizing the current partition when an operation is encountered that violates a hardware resource constraint; and
starting a next partition with the operation that violated the hardware resource constraint; and
storing one or more finalized partitions.

24. The method of claim 23 further comprising:
during traversal of the operations dependency graph in the memory, skipping operations that violate predetermined hardware resource constraints while continuing to consider other operations.

25. The method of claim 1, further including:
responsive to the ready operation with the highest priority temporarily violating a soft hardware resource constraint, temporarily adding the ready operation to the partition, wherein the soft hardware resource constraint comprises a metric that is capable of rising or falling with the addition of more operations to the partition.

26. A computer-readable storage medium storing executable computer program instructions for partitioning operations, the computer program instructions comprising instructions for:
receiving a plurality of operations to be partitioned;
determining respective priorities for each of the plurality of operations;
partitioning the plurality of operations for execution, the partitioning comprising:
identifying ready operations from the plurality of operations, a ready operation comprising an operation that does not have any predecessor operations that have not yet been added to a partition;
determining whether adding a ready operation with a highest priority to the partition violates a hardware resource constraint; and
responsive to the ready operation with the highest priority not violating a hardware resource constraint, adding the ready operation to a current partition.

* * * * *

UNITED STATES PATENT AND TRADEMARK OFFICE
CERTIFICATE OF CORRECTION

PATENT NO. : 7,589,719 B2 Page 1 of 1
APPLICATION NO. : 11/182632
DATED : September 15, 2009
INVENTOR(S) : Owens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fourteenth Day of December, 2010

David J. Kappos
*Director of the United States Patent and Trademark Office*